US007272844B1

(12) United States Patent
Bankers et al.

(10) Patent No.: US 7,272,844 B1
(45) Date of Patent: Sep. 18, 2007

(54) LODGING ENTERTAINMENT SYSTEM WITH GUEST-SELECTED TIME SHIFTING

(75) Inventors: David M. Bankers, Sioux Falls, SD (US); Sanford L. Silverberg, Sioux Falls, SD (US); Gary L. Kolbeck, Canton, SD (US); Brian P. Pelletier, Brandon, SD (US); Randall J. Califf, Sioux Falls, SD (US)

(73) Assignee: LodgeNet Entertainment Corporation, Sioux Falls, SD (US)

( * ) Notice: Subject to any disclaimer, the term of this patent is extended or adjusted under 35 U.S.C. 154(b) by 493 days.

(21) Appl. No.: 09/724,289

(22) Filed: Nov. 28, 2000

(51) Int. Cl.
*H04N 7/18* (2006.01)

(52) U.S. Cl. .............................. 725/78; 725/82; 725/87; 725/92; 725/115

(58) Field of Classification Search ............... 725/39, 725/47, 78, 83, 86–87, 91, 92–95, 114–115, 725/144–145, 74; 386/45, 125–126
See application file for complete search history.

(56) References Cited

U.S. PATENT DOCUMENTS

| 5,077,607 | A | 12/1991 | Johnson et al. |
| 5,523,781 | A | 6/1996 | Brusaw |
| 5,675,828 | A | 10/1997 | Stoel et al. ................. 395/825 |
| 5,729,279 | A | 3/1998 | Fuller ............................ 348/8 |
| 5,767,894 | A | 6/1998 | Fuller et al. .................... 348/8 |
| 5,781,734 | A * | 7/1998 | Ohno et al. ................. 725/115 |
| 5,805,763 | A * | 9/1998 | Lawler et al. ................ 386/83 |
| 5,818,512 | A | 10/1998 | Fuller ............................ 348/8 |
| 5,990,885 | A * | 11/1999 | Gopinath .................... 715/716 |
| 6,157,377 | A | 12/2000 | Shah-Nazaroff et al. |
| 6,163,795 | A * | 12/2000 | Kikinis ....................... 709/203 |
| 6,611,654 | B1 * | 8/2003 | Shteyn ........................ 386/83 |
| 6,769,127 | B1 * | 7/2004 | Bonomi et al. .............. 725/39 |
| 2003/0149988 | A1 * | 8/2003 | Ellis et al. .................... 725/87 |

* cited by examiner

*Primary Examiner*—Ngoc Vu
(74) *Attorney, Agent, or Firm*—Kinney & Lange, P.A.

(57) ABSTRACT

A lodging entertainment system provides a variety of products and services, including free television, pay-per-view movies, video games, guest services, and guest-selected recording of television programs for time-shifted viewing. Through the use of an interactive program guide, the guest may select programs being aired during the guest's stay at the hotel for later viewing, or may elect to record a television program while watching the same or another program.

14 Claims, 3 Drawing Sheets

|  | 8:00 | 8:30 | 9:00 | 9:30 |
|---|---|---|---|---|
| CH. 5 | DIAGNOSIS | MURDER | LOCAL NEWS | SEINFELD |
| CH. 6 | FRIENDS | 3rd ROCK | JUST SHOOT ME | CHEERS |
| MOVIES | MISSION IMPOSSIBLE | | AVAILABLE AT ANY TIME | |
| MOVIES | RULES OF ENGAGEMENT | | AVAILABLE AT ANY TIME | |
| YOUR PROGRAMS | EVERYBODY LOVES RAYMOND | | AVAILABLE AT ANY TIME | |
| RECORDED | ALLY McBEAL | | AVAILABLE AT ANY TIME | |
| RECORDED | BASEBALL-WORLD SERIES-GAME 2 | | AVAILABLE AT ANY TIME | |
| RECORDED | 60 MINUTES | | AVAILABLE AT ANY TIME | |

FIG. 3

LODGING ENTERTAINMENT SYSTEM WITH GUEST-SELECTED TIME SHIFTING

CROSS-REFERENCE TO RELATED APPLICATION(S)

None.

BACKGROUND OF THE INVENTION

The present invention relates to entertainment systems for use in the lodging industry. In particular, the present invention is an entertainment system which permits a guest to select television programs to be recorded and to view previously-recorded television programs at a later time in the guest room.

The past two decades have seen the wide scale introduction of entertainment systems in hotels and other lodging facilities which provide a variety of services to the guest through the guest room television. The range of services typically include regular off-air television programs, pay-per-view movies, Internet access, and guest services such as video shopping and video checkout.

Lodging entertainment systems typically include a head end which is located within the lodging facility and which is linked to guest terminals in the individual guest rooms by an MATV cable distribution system. The distribution system provides transmission of both audio/video RF signals, as well as two way data and digital communication (typically RF) signals between the head end and guest terminals.

Typically, lodging entertainment systems are not owned by the hotel, but rather are provided by a vendor who provides the head end equipment, and the guest terminal (including the television, remote control, game controller, keyboard, and associated control circuitry which interfaces the television to the distribution system).

The entertainment system vendor owns the equipment and pays for the installation of the system in the lodging facility. The vendor must also provide the content, such as movies, games, and cable/satellite programming. The vendor receives compensation based upon amounts the hotel collects from the guest for pay-per-view movies, games, Internet access, and other services for which charges are made. The hotel usually receives a percentage of the guest charges, and the sources of content, such as motion picture studios and game program vendors, receive royalties for movies and games which are viewed and played by guest.

In many cases, a guest may not purchase any of the services being offered through the entertainment system. The amount of purchases depend upon the popularity of the movies and other products/services being offered, vacancy rates at the hotel, the demographics of the guests, and the extent of free offerings available through the entertainment system.

There is a continuing need for new and improved offerings which will result in higher purchase rates through the lodging entertainment system. At the same time, any additional products/services which also require significant increases in capital investment in the entertainment systems are difficult to justify. For example, if a new service will require additional capital equipment to be installed in every guest room, or will require the addition of expensive hardware or software at the head end, the total cost of the additional hardware and software must be weighed against the increase in purchases which can be expected from the additional capital investment.

BRIEF SUMMARY OF THE INVENTION

The entertainment system of the present invention uses a digital content server and associated mass storage to provide program content, on request, to guest terminals located in guest rooms. Program content includes movies and time shifted program content.

The present invention permits time shifted recording and viewing which is controlled by the guest through the guest terminal. The guest may select an interactive program guide to be displayed on the guest terminal. From the program guide, the guest may select a program which will be broadcast during the guest's stay at the hotel. Upon selection of a program for recording, the host computer will coordinate the operation of an encoding array which can be scheduled to record any channel from the cable or satellite distribution of programming received at the hotel. When the requested program is broadcast, it is received at the headend, encoded and stored in the mass storage. The interactive program guide is updated to include programs, which have been recorded and stored at a guest's request. The guest can request playback recorded programs, and the digital content server will retrieve the stored program and play the program for the guest.

BRIEF DESCRIPTION OF THE DRAWINGS

FIG. 3 shows an interactive program guide screen.

DETAILED DESCRIPTION

Figure 1:
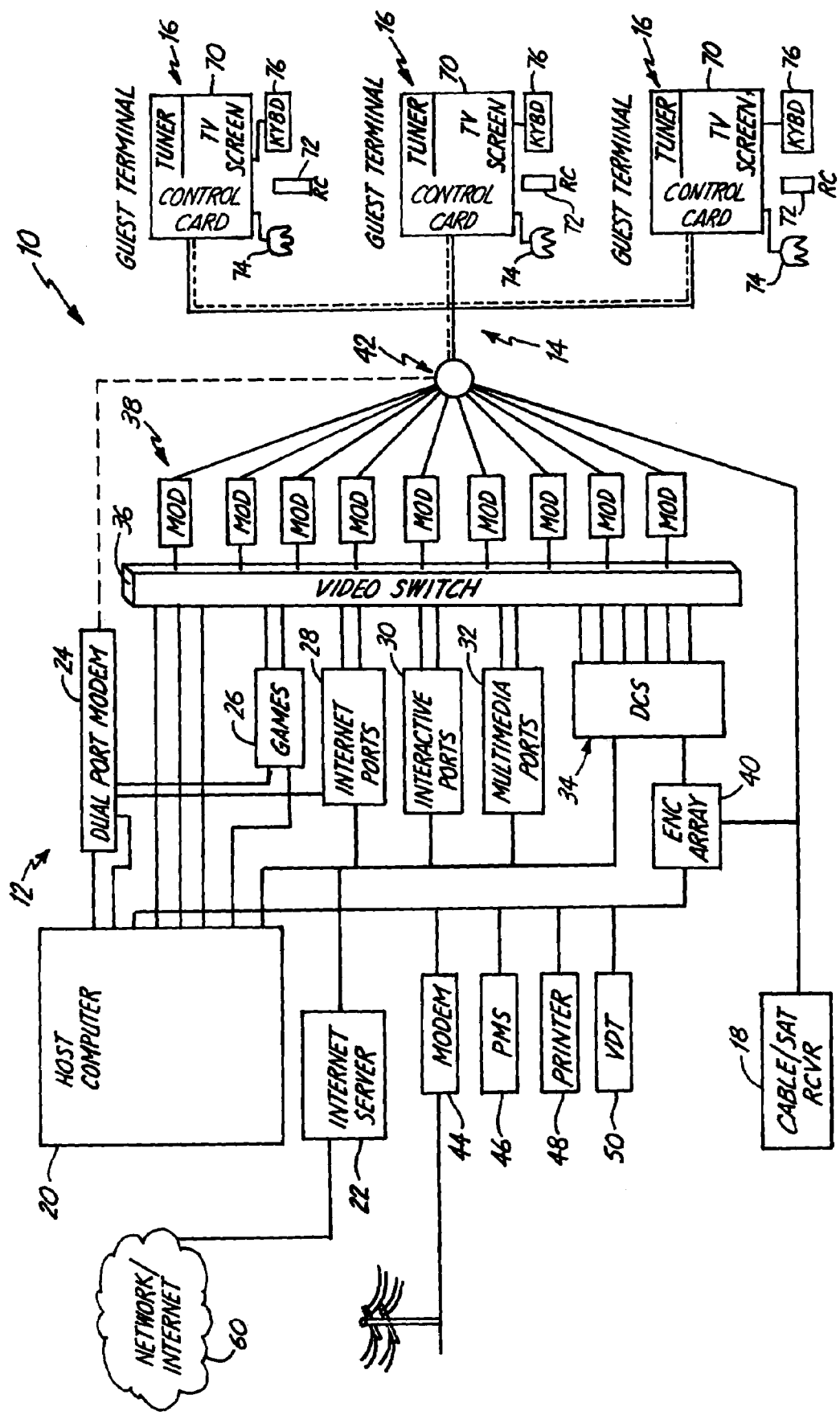
FIG. 1 is a block diagram of a hotel entertainment system which permits guest-selected recording and time-shifted viewing of television programs.

FIG. 1 is a block diagram showing a system overview of hotel entertainment system 10 which delivers television programming, video-on-demand (VOD) movies, interactive video games, Internet access, and other interactive video services to individual guest rooms of a hotel or other lodging facilities. Among the services offered to the guest is the ability of the guest to select programs broadcast during the guest's stay to be recorded for later viewing. Entertainment system 10 includes four primary portions: headend 12, distribution system 14, guest terminals 16, and cable/satellite receiver 18.

Audio/video RF signals for all channels of the cable television system are provided from headend 12. The audio/video RF signals from headend 12 may include off-air local television channels, direct broadcast satellite programming, interactive menus and interactive program guides, video-on-demand programming, interactive video games, Internet services, and other interactive video and multi-media services. Based upon system control data transmitted and received via distribution system 14 from guest terminals 16, headend 12 controls the operation of interactive menus and program guides, VOD movies, interactive games, Internet services, and other interactive services.

Distribution system 14 is preferably an MATV cable distribution system conventionally used in hotels and other lodging facilities. Distribution system 14 permits the transmission of both audio/video RF signals, as well as two-way data and digital communication (typically RF) signals between headend 12 and guest terminals 16.

Headend 12 includes UNIX host computer 20 (UHC), Internet server and network interface 22, dual ported modem 24, game platform 26, Internet ports 28, interactive ports 30, multi-media ports 32, digital content server (DCS) 34, video switch 36, a bank of selectable modulators 38, encoder array 40, combiner/diplexer 42, telecom modems 44, property management system (PMS) 46, printer 48, and video display terminal (VDT) 50.

UNIX host computer (UHC) 20 is, in a preferred embodiment, a Pentium II or Pentium III computer which runs UNIX operating code, together with software for coordinating the operations of components of headend 12. UHC 20 houses several different computer cards and components. In the embodiment shown in FIG. 1, UHC includes an intelligent communications processor (ICP) card, a multi-port serial card, a number of interactive video port cards, an SCSI interface card, and an ethernet card. In addition, UNIX host computer 20 also houses storage devices such as floppy disk drive, a backup drive, a CD ROM drive, and a hard disk drive.

UHC 20 manages the operation of several other devices of headend 12, together with communication tasks. UHC 20 communicates with dual port modem (DPM) 24, encoder array 40, modem 44, property management system 46, printer 48, and video display terminal 50 over serial lines such as RS-232 lines connected to serial card of UHC 20.

UHC 20 is in charge of polling all of the guest terminals 16 for keystroke activity. The polling function is performed by ICP through DPM 24. ICP communicates with DPM 24 over a high speed serial line. The results of the polling are received back over distribution system 14 and are routed through diplexer/combiner 42 to DPM 24. Depending upon the particular keystrokes that are returned, DPM 24 will return the keystrokes to the serial card of UHC 20, to game platform 26, or to Internet ports 28 through serial lines, or other services which may be implemented.

UHC 20 communicates with game platform 26 by a high speed serial line between the SCSI port of UHC 20 and game platform 26. For example, game programs stored by UHC 20 are downloaded to the individual game engines of game platform 26 based upon game ordering and selection made by the guest through guest terminals 16.

UHC 20 communicates through its ethernet card with Internet server 22, Internet ports 28, interactive ports 30, multi-media ports 32 and digital content server 34. Internet server 22 provides a communication interface between headend 12 and network/Internet 60.

The outputs of interactive ports of UHC 20, as well as the outputs of game platform 26, Internet ports 28, interactive ports 30, multi-media ports 32, and digital content server 34 are baseband audio/video signals which are provided to inputs of video switch 36. The outputs of video switch 36 are connected to a bank of modulators 38. Video switch 36 is controlled by UHC 20 to route particular baseband audio/video outputs to the inputs of selected modulators of bank 38.

Game platform 26 is a device that allows a guest to purchase an interactive video game and to view that game at guest terminal 16. Game platform 26 sends game audio and video and game data through video switch 36, one of the modulators 38, combiner/diplexer 42 onto distribution system 14 to guest terminals 16.

Game platform 26 receives information from UHC 20 from the SCSI card. Keystrokes which are received back from the guest terminal 16 are received by DPM 24 and routed to the appropriate game engine of game platform 26 which corresponds to the guest who has sent the keystroke.

Internet ports 28 send audio and video information from the Internet to the appropriate guest terminal. The output of Internet ports 28 are connected to the appropriate modulator, so that the audio and video is placed on a channel to which the guest terminal of the guest conducting the Internet session is tuned.

Interactive ports 30 provide audio and video associated with menuing, program guides and other interactive services. These include guest services such as video checkout, interactive shopping, surveys, opinion polls, and room service ordering.

Multi-media ports 32 provide a wide variety of different audio and visual programs to a subscriber. These can include, for example, video directories, advertising, and other information services.

Digital content server 34 includes digital storage (e.g. a RAID hard disc array) with storage capacity to store all desired program content to be offered to the guest. This includes, for example, movies, music, web cinema, pre-recorded broadcast programs from a central site, and guest-selected programs recorded for time-shifted viewing. The content is stored in files in the digital storage, and each type of service has its own directory where its content is stored. The overall storage space is shared among the various services. The content is stored in an encoded format such as MPEG-2.

Digital content server 34 includes decoders for converting the stored content to baseband audio/video during playback. The outputs of digital content server 34 are output ports which are connected through video switch 36 to selected modulators 38.

Video switch 36 is a device that receives baseband audio and video signals at its input ports, and routes those signals to output ports which are connected through individual lines to inputs of individual modulators 38. Video switch 36 is capable of connecting any one of the baseband audio/video signals received at its inputs to any one more of the bank of modulators 38. Although one video switch is shown in FIG. 1, multiple video switches can be used as needed. Operation of video switch 36 is under control of UHC 20, which tells video switch 36 which input port connect to which output port.

Modulators 38 convert baseband video and audio signals received at their inputs to RF and deliver the signals to combiner/diplexer 42. Each modulator is set to modulate on a specific frequency or RF channel. The outputs of modulators 38 are connected to inputs of combiner 42.

As shown in FIG. 1, cable/satellite receiver 18 receives cable or satellite programming, which is supplied to combiner/diplexer 42. Receiver 18 provides the programming (which is the free-to-guest television programs) on channels which are different from the channels produced by modulators 38. In that way, there is no channel overlap between the free-to-guest television programming and the other offerings (such as pay-per-view movies or games).

Encoder array 40 is a computer with a group of tuner/encoder cards which can be scheduled to record any channel of the cable/satellite programming from receiver 18. Multiple encoder cards allow different channels to be encoded at the same time. Encoder array 40 receives instructions as to the channel and time of encoding from UHC 20. Once the program has been encoded to a file (such as an MPEG-2 file), the data is moved to digital content server 34 via an ethernet or SCSI connection. Once the file is stored in digital content server 34, a guest can choose to playback the file (i.e. the recorded program). File names are unique, and preferably identify the guest and the program recorded so that multiple guests can have files stored in digital content server 34, and a guest can have multiple files. Recorded files can be deleted when the guest who requested recorded of that program checks out, or at a predetermined time after recording. Control of deleting files is by UHC 20.

UHC 20 communicates with the owner/operator of entertainment system 10 through modem 44. The system owner and operator is typically remote from the hotel facility, and must receive usage, billing, and financial information in order to settle accounts with the hotel. In addition, control and trouble shooting information can be communicated to and from UHC 20 through modem 28.

Property management system (PMS) 46 is a computer system operated by the hotel to track charges incurred by individual guests. These charges typically include room charges, as well as dining charges, room service, telephone charges, charges for use of hotel entertainment system 10, and a variety of other charges. As charges related to system 10 are incurred, UHC 20 communicates that information to PMS 46. During video checkout operations, UHC 20 communicates with PMS 46 to obtain the data necessary to show the guest, on guest terminal 16, a folio of charges associated with that guest's room. The video checkout system allows the guest to approve the charges and to authorize payment for those charges through a credit card number previously given to the hotel and stored in property management system 46.

Guest terminal 16 includes television 70, remote control 72, game controller 74, and keyboard 76. Each television 70 has a television screen for viewing, and has an associated television tuner and a control card which interfaces guest terminal 16 with distribution system 14 and headend 12.

The control card of guest terminal 16 receives keystrokes from remote control 72, game controller 74, and keyboard 76. In the case of remote control 72, the keystrokes are in the form of infrared signals which are transmitted from an infrared transmitter within remote control 72 to an infrared receiver associated with television 70. The keystrokes are passed by the control card to distribution system 14 back to headend 12. The guest selects options by viewing interactive menus on the screen of television 70 and pressing keys of remote control 72 accordingly. These key presses are received and stored by the control card. In response to polling signals from headend 12, the control card provides system data representing the keystrokes to headend 12 which indicates which key or keys have been pressed.

Video game controller (or game paddle) 74 is connected by a cable to television 70. Alternatively, game paddle 74 can be connected via an IR link. Keystrokes from game paddle 74 are supplied to the control card, and then are supplied as part of system data in response to polling of guest terminals 16 by headend 12. In some embodiments, game paddle 74 includes keys which duplicate keys on remote control 72 so that game paddle 74 can be used to initiate interactive sessions and order programs without the need to use remote control 72.

Keyboard 76 is connected to television 70 either through a cable or by an IR link. Keystrokes from keyboard 76 are supplied by the control card of guest terminal 16 to headend 12 in response to polling. Keyboard 76 is useful for interactive services such as Internet, e-mail and computer games. Keyboard 76 can, in some cases, be used to initiate interactive sessions, order programs or select programs to be recorded, rather than using remote control 72.

When a guest wishes to use entertainment system 10, the guest presses a key on remote control 72 to turn on television 70. A welcome screen will first appear on the TV screen of guest terminal 16. If the guest wishes to view off-air or satellite programming which is free programming, those channels are accessible by pressing the channel up or channel down keys on remote control 72. If, on the other hand, the guest wishes to view and perhaps select other offerings of system 10, such as on demand movies, Internet access, interactive video games, recording of broadcast programs for time-shifted viewing, or interactive services, the welcome channel screen provides an instruction to the user to select a menu. Upon pressing the menu key, a signal is provided to the control card 50, which stores the keystroke information until the next time that guest terminal 16 is polled by headend 12. In response to polling, the keystroke indicating pressing of the menu key is supplied to headend 12. This results in UHC 20 selecting one of the interactive ports (which are either internal to UHC 20 or are part of interactive ports 30) to display a series of interactive menus which are navigated by the guest through the use of keystrokes supplied by remote control 72 (or alternatively game paddle 74 or keyboard 76). Depending upon the selections made by the guest in response to the screens which are displayed, UHC 20 will activate the requested service which may be provided by game platform 26, Internet ports 28, interactive ports 30, multi-media ports 32, digital content server 34, or encoder array 40. UHC 20 routes the selected output through video switch 36 to a modulator representing one of the available channel and sends digital control signals to the control card of the guest terminal 16 to cause guest terminal 16 to tune to the channel on which the requested service is to appear.

Guest-selected recording and time-shifted viewing offers hotel guests the ability to schedule the recording of programs from the channel line up at the hotel and be able to watch the programs at a later time. The channel line up represents the programs from cable/satellite receiver 18 which are available for viewing by the hotel guest. The programs are typically "free-to-guest" programs, in that the hotel does not charge separately for viewing of those programs.

There are times when a hotel guest would like to watch a particular program, but will not be available when that program is being broadcast. For example, a guest may have checked into the hotel at 6:00 in the evening. The guest's favorite program, "Everybody Loves Raymond" is on at 7:30 that evening. The guest, however, has a dinner meeting from 6:30 to 8:30, and therefore will miss the broadcast. Similarly, the guest may wish to view two programs which are being broadcast at the same time.

With the guest selected-recording and time-shifted viewing service of the present invention, the guest can record programs in order to view them at a later time. As part of the menu options offered by system 10, an interactive program guide may be selected by the guest. The interactive program guide lists the cable/satellite programming with the time of broadcast and the particular channels. The guest selects the programs which he or she wishes to record from the interactive program guide. The selection is made interactively through the use of remote control 72 or keyboard 76, and the selections are provided through MATV distribution 14 back to UHC 20 in headend 12. UHC 20 creates a recording schedule based on selections made by the guests. When selected program (e.g. "Everybody Loves Raymond") is received by cable/satellite receiver 18, UHC 20 causes encoder array 40 to encode the programming into the encoded file format (such as MPEG-2). Encoder array 40 delivers the recorded program as a digital file to digital content server 34 for storage in the mass storage of digital content server 34. The digital file has associated with it the guest identification and an identification of the program which was recorded.

When the guest returns to his or her room, guest may again select the interactive program guide. Among the programs which will be displayed on the program guide is "Everybody Loves Raymond", which will be indicated as available for viewing at any time. The guest may then select the previously recorded program for viewing.

There are several alternative ways in which the guest may be charged for the recording and time-shifting service, and several alternative ways in which the availability of time-shifted programs may be presented to guests. For example, the guest may select the time-shifting option and be charged a set fee per day, a fee for each program recorded, a fee for each half hour of programming recorded, a fee based upon the number of programs recorded and viewed, or a fee based only on recorded programs which are viewed. The information provided through interactive menus and the interactive program guide will differ, of course, depending upon the particular way in which guests will be charged for use of the service.

For example, one option available is to allow guest to view not only programs selected for recording by that guest, but also programs selected for recording by other guests at the hotel. In that case, the interactive program guide may include a listing of free-to-guest programs, the previously recorded programs selected by the particular guest, and previously recorded programs selected by other guests. Depending upon the particular way in which the hotel will charge for the time-shifting services, a selection of a previously recorded program from the interactive program guide may result in a charge being made to the guest's account. The determination of whether a charge is to be made is done by UHC 20. To avoid disputed charges, the selection from the interactive program guide of a previously recorded program may be followed by a follow-on screen requesting that the guest verify the selection and order of the time-shifted program (with the associated charge to be made), before the program is played back by digital content server 34 and delivered to that particular guest television 70.

In one embodiment of the invention, the use of the time-shifting feature by the guest is achieved as follows. When the guest first turns on the television, a welcome channel appears. The welcome channel screen may identify the "hotel" as well as the entertainment service provider. The general description of available services is included. If the guest presses the channel up or down buttons, the television will be tuned to one of the free-to-guest channels. On the other hand, if the guest presses the menu button on the remote control 72, the headend will produce first an interstitial screen indicating that the system is "accessing" and then will display a main menu screen.

Figure 2:
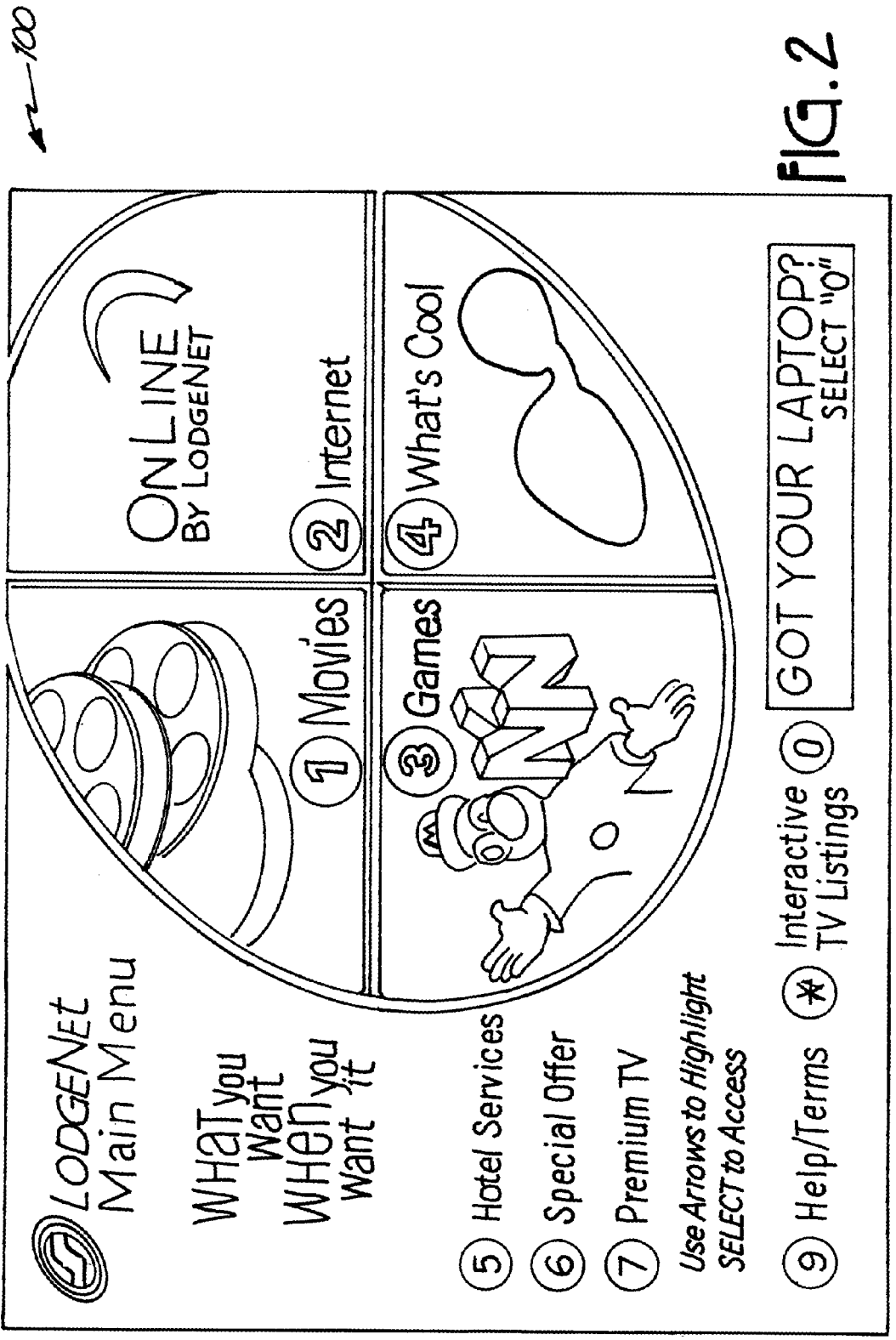
FIG. 2 shows a main menu screen.

The main menu screen includes listings of various services available for selection by the guest. FIG. 2 shows an example of main menu screen 100, which lists ten different selectable services: "movies", "Internet", "games", "what's cool", "hotel services", "special offer", "premium T.V.", "help", "interactive T.V. listings", "got your laptop?" The guest uses the navigational arrow buttons on remote control 72 to highlight one of the available services, or uses the key number or symbol associated with the services. For example, key "3" can be pressed to highlight games, while key "*" can be pressed to highlight "interactive T.V. listings" (which will lead to the interactive program guide). To access the highlighted service, the guest must then press the select button on the remote control 72.

FIG. 3 shows an example of interactive program guide 200, which provides the guest with a number of options including guest-selected recording of programs and time-shifted viewing of recorded programs. Interactive program guide 200 includes programming information 210 for each of the free-to-guest channels available to the guest. For illustration only, two channels are shown in FIG. 3. Interactive program guide 200 shows the times 220 at which programs will be broadcast on each of channels, and allows the guest to scroll forward over several days of programming, so that the guest can see what programs will be running at time in the future. UHC 20 may receive the programming information necessary to produce interactive program guide 200 from a number of different sources. For example, programming information can be received from the Internet 60 through Internet server 22. Programming information also may be supplied to UHC 20 by receiver 18 from data supplied along with the cable/satellite programming.

Interactive program guide 200 also provides the opportunity to make the guest aware of pay-per-view offerings 230 and previously recorded programming 240 which is now available for time-shifted viewing. The time-shifting offering may be a listing of all offerings regardless of which guest requested recording, or may be separated into two categories: the specific guest's recorded programs 250, and the recorded programs 260 selected by other guests. The order in which information 210, 230, 250, and 260 is presented can, of course, be arranged differently than the example shown in FIG. 3.

The guest may use interactive program guide 200 for several purposes. First, the guest may review the programs in information field 210 which are currently being aired, and make a selection of a program by highlighting that program on program guide 200. By highlighting and then selecting a currently playing program, the guest is requesting that UHC 20 tune that guest terminal to the free-to-guest channel which carries that program. In response to the key strokes by the guest, UHC 20 causes the tuner of guest terminal 16 to tune the television to the requested free-to-guest channel.

Second, the guest may use interactive program guide 200 to select a pay-per-view movie. If a movie in field 230 is highlighted and selected, UHC 20 will display a "description and order" screen for the selected movie. This screen includes a description of the movie, an indication of the price for ordering the movie, and includes "go back" and "order" selections". If the guest presses "go back", this indicates that the guest is not interested in ordering the movie, and interactive program guide 200 is again displayed on the guest terminal screen. If the guest selects "order", a "thank you" screen is displayed, and then the ordered movie begins to play. UHC 20 provides the necessary control inputs to digital content server 34 locate the digital file containing the ordered movie and to initiate its play back. In addition, UHC 20 selects an available modulator from the bank of modulators 38 and configures video switch 36 to connect the output port of digital content server 34 at which the ordered movie is being supplied to the selected modulator. Through control signals to the guest terminal 16, UHC 20 causes the guest terminal 16 to be tuned to the particular channel on which the movie is playing. UHC 20 also determines the appropriate charge to be made to the guest's account, and provides that information to PMS 46.

A movie purchase through interactive program guide 200 is an alternative to the selection of a movie by selecting "movies" from the main menu screen 100 shown in FIG. 2. Interactive program guide 200 provides an alternative path for reaching the "description and order" screen from which the pay-per-view movie is ordered.

Third, the guest may use interactive program guide 200 to select and order a previously recorded program for time-shifted viewing. The guest highlights the program of interest from field 240 or field 250 and presses "select". What happens next will depend upon the particular way in which the guest is to be charged for the time-shifted programming feature. If a charge will be made for each time-shifted program that is viewed, then UHC 20 will display an "order" screen in response to the selection of a previously recorded program. The order screen will indicate the price for viewing the time-shifted program, and will include "go back" and "order" options. If the guest selects "go back", interactive program guide 200 will again appear on screen. If the guest selects "order", a "thank you" screen will appear, followed by the play back of the previously recorded program. UHC 20 will control the digital content server 34, video switch 36, and guest terminal 16 in a manner which is similar to the process for viewing a movie. The digital file stored in digital content server 34 containing the previously recorded program will be accessed, decoded and played back. The output of digital content server 34 will be connected through video switch 36 to an appropriate modulator 38, and the appropriate guest terminal 16 will be tuned to the appropriate channel to allow the guest to watch the program as it is played back.

If the guest is charged for recording a program but is not charged again for playing that program back, then the display of the order screen may not be necessary—if the program being viewed is one which the guest caused to be recorded. Since the guest's identification is associated with the recorded program, UHC 20 can check to see whether the guest is selecting one of the programs that the guest recorded, or whether the program was recorded by a different guest. This may allow different treatment in terms of charges to the guest depending upon who recorded the program.

Fourth, the guest can use the interactive program guide to select for recording a program which is not yet being aired. When the guest highlights and selects a program schedule to happen in the future, UHC 20 causes interactive program guide 200 to acknowledge that the guest is requesting that the program be recorded for later viewing. If there is a charge for the recording of programs (as opposed to the viewing of programs), interactive program guide 200 will indicate that there is a charge and will require a further action, (such as the pressing of an order key) to continue. When the guest has confirmed the desire to record the program, UHC 20 stores the necessary information to coordinate a recording process in a recording schedule. At the appropriate time, UHC 20 activates encoder array 40 to tune to the program of interest during the time that it is playing. Encoder array 40 encodes the program as it is being broadcast and then transfers the encoded file to the digital content server 34 for storage.

Fifth, interactive program guide 200 can be used by the guest to both select a program for viewing and simultaneously view the same program or a program on another channel. The guest may wish to record the program while watching it if, for example, the guest expects to leave partway through the program and would like to see how it finishes, or expects any interruption, such as a phone call while watching. The simultaneous viewing and recording of programs also allows the guest to effectively "rewind" and watch certain parts of program over again or to in effect "pause" the live television program and then resume viewing later. These features are achieved through button presses at remote control 72 which are interpreted by UHC 20 and used to control operation with digital content server 34.

As programs are recorded and transferred as digital files to digital content server 34, UHC 20 updates interactive program guide. Thus, not only is program guide 200 changing over time so that it only reflects programs currently playing and programs available in the future, but it is also being changed to reflect the then current line up of recorded programs available for time-shifted viewing. As each program is recorded and the file is transferred to digital content server 34, interactive program guide 200 is updated to reflect the inclusion of that recorded program.

In order to remind a guest that the guest has recorded a program for time-shifted viewing, a special on screen message may be provided to the guest. This message may be superimposed onto the welcome channel screen or main menu screen 100, or may be a separate screen. UHC 20 determines whether to provide that message depending upon the directory of files of recorded programs stored in digital content server 34. Identification of the guest (or guests) which have requested recordings of programs is a part of the information associated with the file.

To conserve storage space and to eliminate the storage and subsequent listing of the same program requested for recording by multiple guests, UHC 20 preferably receives and stores all requests for recording programs, creates a consolidated recording schedule, and then associates each guest who requested a particular program with the digital file for that program. This avoids having to record the same program multiple times, once each for every different guest who requests that the program be recorded.

The guest-selected recording and time-shifting of television programs provides another service to the guest, and another opportunity for revenues through entertainment system 10. By recording on site, rather than at a remote centralized location, the system gives the guest the opportunity to record programs of local content. No large files need to be distributed from a central location out to the individual sites in order to accommodate time-shifted viewing. Instead, only those programs of interest to the particular guests of the hotel are recorded, and the recording is done locally. The ability of each guest to select programs for recording and later viewing makes entertainment system 10 more attractive to the guest and increases usage of the system and revenue derived from its use.

Other implementations of the present inventions are possible. For example, in other embodiments the encoder array may be combined with its own separate digital content server, so that recording and play back of television programs is separate from the digital content server which provides movies and other pre-recorded material.

Similarly, the encoder array can be incorporated into the digital content server, so that no separate interconnection between the two units is required. The interactive program guide can take a number of different forms. As it relates to the time-shifting feature, the interactive program guide makes use of program schedules and channel line ups to simplify the process of choosing the correct channel, time, and duration of recording. Although other techniques can be used, such as those used in conventional VCR recording (which involves the user selecting a particular time, channel, and duration), the use of a interactive program guide gives the guest an interface which is simple and intuitive to use.

In addition, the interactive program guide gives the opportunity to also make the guest aware of previously recorded television programs which are available for time-shifted viewing, as well as other entertainment offerings, such as pay-per-view movies.

The present invention gives the guest recording options which simulate having a personal VCR device in each room, without the significant cost. By using a shared encoder array, which records programs based upon a recording schedule set by UHC 20 in response to recording selections made by the guests, each guest has the opportunity to personalize the entertainment system to his or her needs and desires.

Although the present invention has been described with reference to preferred embodiments, workers skilled in the art will recognize that changes may be made in form and detail without departing from the spirit and scope of the invention.

The invention claimed is:

1. A method of guest-selected recording of television programs in an entertainment system at a lodging facility having a head end and a plurality of guest terminals in a plurality of guest rooms connected by a distribution system, the method comprising:

creating, at the head end in the lodging facility, a schedule containing both (a) television programs available for viewing and recording and (b) previously recorded television programs available for time-shifted viewing;

transmitting, from the head end in the lodging facility to a guest terminal in a guest room in a lodging facility, television signals representing the schedule created;

transmitting, from the guest terminal to the head end, program recording selection data representing a program selected by a guest for recording;

creating, at the head end, a digital file representing the program selected;

storing, at the head end, the digital file;

updating, at the head end, the schedule of television programs to include the program corresponding to the digital file;

transmitting the schedule as updated in the form of television signals, from the head end to the guest terminal in a guest room;

transmitting, from the guest terminal to the head end, data requesting playback of the program selected for recording based upon a selection of that program from the schedule as updated;

playing back, at the head end, the program selected based upon the digital file representing the program selected;

transmitting the program being played back to the guest terminal; and displaying the program at the guest terminal.

2. The method of claim 1 wherein creating a digital file comprises:

tuning to a channel on which the program selected is carried; and encoding the program into a digital format to create the digital file.

3. The method of claim 1 and further comprising:

creating a recording schedule based upon program recording selection data received.

4. The method of claim 3 wherein creating a digital file is based upon the recording schedule.

5. The method of claim 1 and further comprising:

associating with the digital file an identification of the guest terminal that provided the program recording selection data.

6. The method of claim 1 wherein the schedule of television programs is an interactive program guide.

7. The method of claim 6 wherein the program recording selection data is produced based upon a selection made on the interactive program guide.

8. A method of guest-selected recording of television programs in an entertainment system having a head end and a plurality of guest terminals connected by a distribution system, the method comprising:

transmitting, from a head end in a lodging facility to a guest terminal in the guest room in the lodging facility, television signals representing a program schedule containing both (a) available scheduled television programming and (b) previously recorded programs available for time-shifted viewing;

receiving, from the guest terminal program selection data representing a scheduled program selected for recording;

digitally storing the program selected, at the head end, when it is broadcast;

updating the program schedule, at the head end, to include the program selected for recording as one of the previously recorded programs;

receiving at the head end, from the guest terminal, playback request data based on the previously recorded programs contained in the program schedule being updated;

converting at the head end, in response to the playback request data, the digitally stored program to television signals;

transmitting the television signals from the head end to the guest terminal; and displaying the program at the guest terminal.

9. The method of claim 8 wherein digitally storing the program file comprises:

tuning to a channel on which the program selected is carried; and encoding the program into a digital format to create a digital file.

10. The method of claim 9 and further comprising:

associating with the digital file an identification of the guest terminal that provided the program recording selection data.

11. The method of claim 8 and further comprising:

creating a recording schedule based upon program recording selection data received.

12. The method of claim 11 wherein digitally storing the program is based upon the recording schedule.

13. The method of claim 8 wherein the program schedule is an interactive program guide.

14. The method of claim 13 wherein the program selection data is produced based upon a selection made on the interactive program guide.

* * * * *